(12) United States Patent
Meadowcroft et al.

(10) Patent No.: US 8,550,727 B2
(45) Date of Patent: Oct. 8, 2013

(54) PARALLEL OPTICAL COMMUNICATIONS SYSTEM THAT INCORPORATES A METHOD AND APPARATUS FOR PERFORMING ELECTROMAGNETIC INTERFERENCE (EMI) CONTAINMENT

(75) Inventors: David J. K. Meadowcroft, San Jose, CA (US); Fang Wang, San Ramon, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/356,848

(22) Filed: Jan. 24, 2012

(65) Prior Publication Data

US 2013/0188914 A1   Jul. 25, 2013

(51) Int. Cl.
*G02B 6/36* (2006.01)
*G02B 6/00* (2006.01)

(52) U.S. Cl.
USPC .................. 385/94; 385/87; 385/89; 385/92; 385/136; 385/137

(58) Field of Classification Search
USPC ......... 385/2, 8, 14, 62, 65, 81, 83, 87–92, 94, 385/114, 135–137, 139
See application file for complete search history.

(56) References Cited

U.S. PATENT DOCUMENTS

| 4,903,402 | A | 2/1990 | Norton et al. |
| 7,013,088 | B1 | 3/2006 | Jiang et al. |
| 7,422,481 | B2 | 9/2008 | Togami et al. |
| 7,484,896 | B2 | 2/2009 | DeCusatis et al. |
| 7,794,156 | B2 | 9/2010 | Wang et al. |
| 2009/0060519 | A1* | 3/2009 | Wang et al. .................. 398/139 |
| 2010/0296817 | A1 | 11/2010 | Togami et al. |
| 2011/0268390 | A1* | 11/2011 | Yi et al. ........................ 385/50 |

\* cited by examiner

*Primary Examiner* — Kaveh Kianni
*Assistant Examiner* — Hung Lam (57) ABSTRACT

Methods and apparatuses are provided for performing electromagnetic interference (EMI) containment in a parallel optical communications system. The apparatus includes a curved surface formed in the system housing near the opening through which a stack of ribbon cables passes, and a spring device. The stack of ribbon cables is sandwiched in between the curved surface of the housing and the spring device. The spring device exerts a force on the stack of ribbon cables that presses the stack against the curved surface of the housing and forms a sharp bend in the stack just before the stack passes through the opening in the housing. Because EMI radiation is restricted to propagation along the sharply bent pathway of the stack of ribbon cables, most or all of the EMI radiation traveling along that pathway is either attenuated or reflected before it reaches the opening.

31 Claims, 6 Drawing Sheets

PARALLEL OPTICAL COMMUNICATIONS SYSTEM THAT INCORPORATES A METHOD AND APPARATUS FOR PERFORMING ELECTROMAGNETIC INTERFERENCE (EMI) CONTAINMENT

TECHNICAL FIELD OF THE INVENTION

The invention relates to parallel optical communications systems. More particularly, the invention relates to a method and apparatus for performing electromagnetic interference (EMI) containment in a parallel optical communications system.

BACKGROUND OF THE INVENTION

A parallel optical communications module may be a parallel optical transceiver module, a parallel optical transmitter (Tx) module, or a parallel optical receiver (Rx) module. A parallel optical Tx module includes a plurality of laser driver circuits and a plurality of respective laser diodes. Each laser driver circuit outputs an electrical drive signal to its respective laser diode to cause the respective laser diode to be modulated. When the laser diode is modulated, it outputs optical signals that have power levels corresponding to logic 1s and logic 0s. An optics system of the parallel optical Tx module directs the optical signals produced by each respective laser diode into the end of a respective transmit optical fiber held within an optical connector module that connects to the parallel optical Tx module. The optical fibers are typically part of an optical fiber ribbon cable.

A parallel optical Rx module includes a plurality of receive photodiodes that receive respective incoming optical signals output from the ends of respective receive optical fibers, which are typically also part of an optical fiber ribbon cable. An optics system of the parallel optical Rx module focuses the light that is output from the ends of the receive optical fibers onto the respective receive photodiodes. The respective receive photodiodes convert the respective incoming optical signals into respective electrical analog signals. Electrical detection circuits, such as transimpedance amplifiers (TIAs), receive the respective electrical analog signals produced by the respective receive photodiodes and output corresponding amplified electrical signals, which are processed by other circuitry of the Rx module to recover the data.

A parallel optical transceiver module includes an optical Rx and an optical Tx for simultaneously transmitting and receiving optical data signals over the optical fibers of one or more optical fiber ribbon cables.

The optical fiber ribbon cables used in parallel optical Tx, Rx and transceiver modules typically have ends that are terminated with optical connector modules, which are configured to be plugged into a receptacle of the optical Tx, Rx or transceiver module. Some parallel optical communications systems comprise a plurality of parallel optical Tx, Rx, or transceiver modules that are arranged inside of a system housing. In such arrangements, each parallel optical Tx, Rx or transceiver module is connected to a respective optical connector module that holds the end of a respective optical fiber ribbon cable. The opposite ends of the optical fiber ribbon cables pass out of the housing through an opening formed in the housing. Therefore, this opening must be at least large enough in width and height to accommodate the width and height of a stack of two or more optical fiber ribbon cables.

In such arrangements, the opening in the housing through which the stack of ribbon cables passes constitutes an EMI open aperture that allows EMI to escape from the housing. The Federal Communications Commission (FCC) has set standards that limit the amount of electromagnetic radiation that may emanate from unintended sources. For this reason, a variety of techniques and designs are used to shield EMI open apertures in such housings in order to limit the amount of EMI that passes through the apertures. Various metal shielding designs and resins that contain metallic material have been used to cover areas from which EMI may escape from the housings. So far, such techniques and designs have had only limited success, especially with respect to parallel optical communications modules that transmit and receive data at high data rates (e.g., 10 gigabits per second (Gbps) and higher).

The amount of EMI that passes through an EMI shielding device is proportional to the largest dimension of the largest EMI open aperture of the EMI shielding device. Therefore, EMI shielding devices are typically designed to ensure that there is no open aperture that has a dimension that exceeds the maximum allowable EMI open aperture dimension associated with the frequency of interest. However, as indicated above, the size of the opening in the housing through which the stack of ribbon cables passes must be at least large enough to accommodate the stack of ribbon cables. Therefore, the opening constitutes an EMI open aperture that is much larger than the maximum allowable EMI open aperture dimension of the optical communications system, particularly at high bit rates. Consequently, unacceptable amounts of EMI may escape from the optical communications system through the opening.

One technique that is sometimes used to provide EMI shielding at the opening in the housing involves placing a metal EMI shielding device in the housing surrounding the opening such that the ribbon cables pass through the EMI shielding device. While such shielding devices are relatively effective at preventing EMI from passing through regions in the housing immediately adjacent the opening, they are totally ineffective at preventing EMI from passing through the opening itself, which is filled only with the fibers and air. Of course, the fibers and the air are transparent to EMI.

Accordingly, a need exists for a way to provide an effective EMI containment solution that significantly limits the amount of EMI that is allowed to pass through this opening in the housing.

SUMMARY OF THE INVENTION

The invention is directed to a parallel optical communications system that incorporates a method and an apparatus for performing EMI containment. The parallel optical communications system comprises a housing, at least a first parallel optical communications module mounted in the housing, at least a first optical fiber ribbon cable that passes through an opening formed in the housing and attaches on one end thereof to the first parallel optical communications module, and a spring device disposed inside of the housing. The housing has a curved surface formed therein adjacent the opening through which the optical fiber ribbon cable passes. The curved surface includes at least first and second curved portions and a transition region in between the first and second curved portions. The spring device and the curved surface of the housing comprise an EMI containment apparatus. The spring device has a curved surface that is generally complementary in shape to a shape of the curved surface of the housing. A length of the first optical fiber ribbon cable is sandwiched in between the curved surface of the housing and the curved surface of the spring device such that the sandwiched length of the first optical fiber ribbon cable has a curved shape that is defined by the curved surfaces of the housing and of the spring device. The curved shape of the sandwiched length of the optical fiber ribbon cable helps prevent EMI radiation from propagating along the sandwiched length of the first optical fiber ribbon cable and passing through the opening of the housing.

In accordance with an embodiment, at least first and second parallel optical communications modules are mounted in the housing and first and second optical fiber ribbon cables pass through the opening formed in the housing and are connected on respective ends thereof to the first and second parallel optical communications modules, respectively. Lengths of the first and second optical fiber ribbon cables form a stack of optical fibers that is sandwiched in between the curved surfaces of the housing and of the spring device such that the sandwiched stack has a curved shape that is defined by the curved surfaces of the housing and of the spring device. The curved shape of the sandwiched stack helps prevent EMI radiation from propagating along the sandwiched stack and passing through the opening of the housing.

The method comprises: inside of a housing of a parallel optical communications system, sandwiching a length of at least a first optical fiber ribbon cable in between a curved surface of the housing and a curved surface of a spring device. The curved surface of the housing and the curved surface of the spring device comprise an EMI containment apparatus. The curved surface of the housing is adjacent an opening of the housing through which the first optical fiber ribbon cable passes. The curved surface of the housing includes at least first and second curved portions and a transition region in between the first and second curved portions. The spring device has a curved surface that is generally complementary in shape to a shape of the curved surface of the housing. The sandwiched length of the first optical fiber ribbon cable has a curved shape that is defined by the curved surfaces of the housing and of the spring device. The curved shape of the sandwiched length of the optical fiber ribbon cable helps prevent EMI radiation from propagating along the sandwiched length of the first optical fiber ribbon cable and passing through the opening of the housing.

In addition, when a stack of optical fibers is sandwiched in between the curved surfaces of the housing and of the spring device, the curved surfaces exert forces on the stack that compress the stack to cause air gaps in between the ribbon cables to be removed. Compressing the stack in this manner decreases the height of the stack, which allows the height of the opening formed in the housing to also be decreased. Decreasing the height of the opening also helps limit the amount of EMI radiation that is allowed to pass through the opening.

These and other features and advantages of the invention will become apparent from the following description, drawings and claims.

DETAILED DESCRIPTION OF AN ILLUSTRATIVE EMBODIMENT

In accordance with the invention, methods and apparatuses are provided for performing EMI containment in a parallel optical communications system. The apparatus includes a curved surface formed in a wall of the housing of the system near the opening through which the stack of ribbon cables passes, and a spring device having a shape that is generally complementary to the shape of the curved surface. The stack of ribbon cables is sandwiched in between the curved surface and the spring device. The spring device exerts a force on the stack of ribbon cables that presses the stack against the curved surface and forms a sharp bend in the stack just before the stack passes through the opening in the housing. Because EMI radiation is restricted to propagation along the sharply bent pathway of the stack of ribbon cables, most or all of the EMI radiation traveling along that pathway is either attenuated or reflected before it reaches the opening.

In addition, the forces exerted on the stack by the spring device and by the curved surface remove air gaps between adjacent ribbon cables of the stack, thereby minimizing the height of the stack, which allows the height of the opening in the housing through which the stack passes to be kept at a minimum. These combined features, i.e., sharply bending the pathway over which EMI radiation must travel and minimizing the height of the opening, greatly limit the amount of EMI radiation that is allowed to pass through the opening, resulting in effective EMI containment. Illustrative embodiments of the EMI containment apparatus and method will now be described with reference to FIGS. 1-6, in which like reference numerals represent like component, elements or features.

Figure 1:
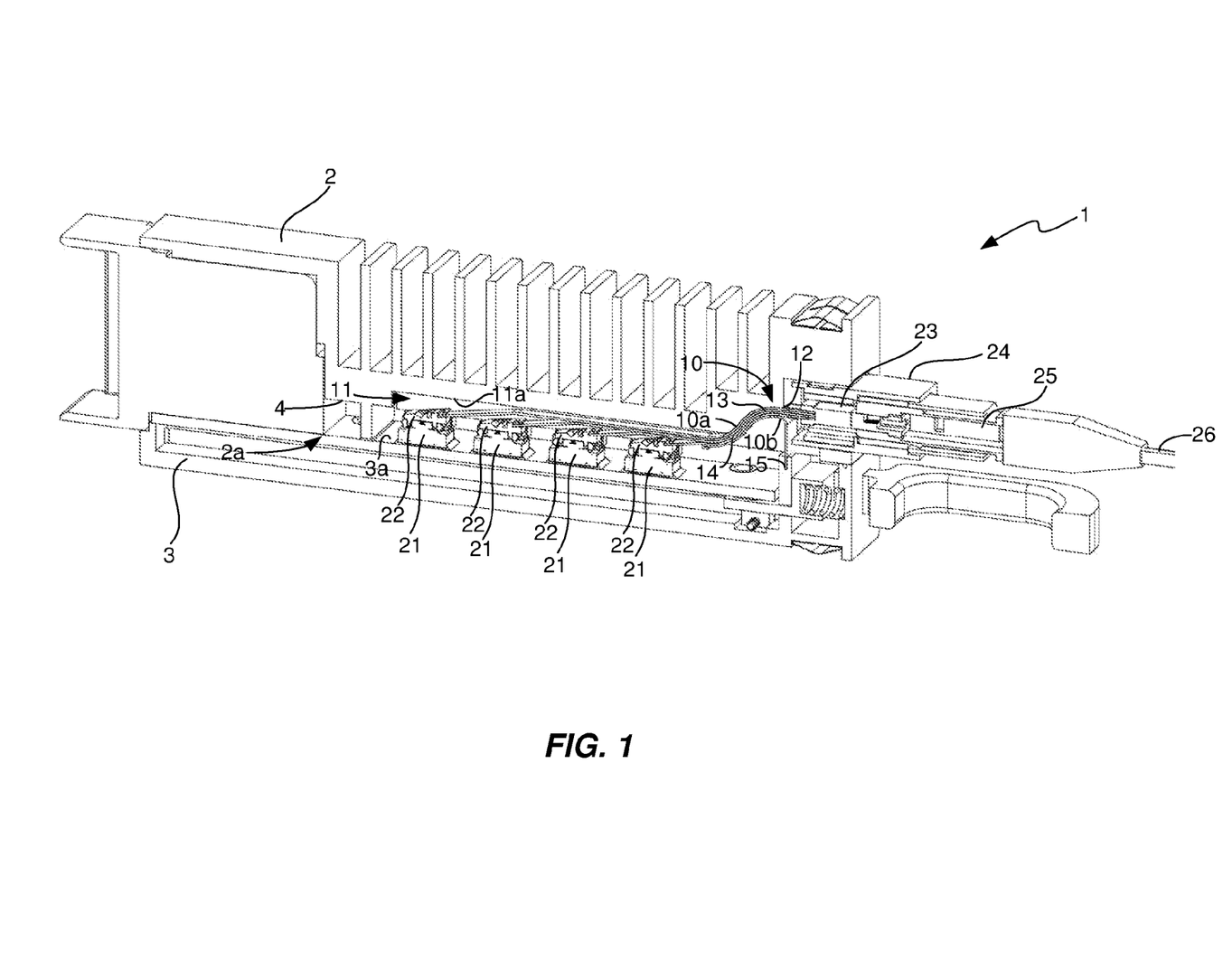
FIG. 1 illustrates a cross-sectional side perspective view of a parallel optical communications system that is equipped with an EMI containment apparatus in accordance with an illustrative embodiment of the invention.
Figure 2:
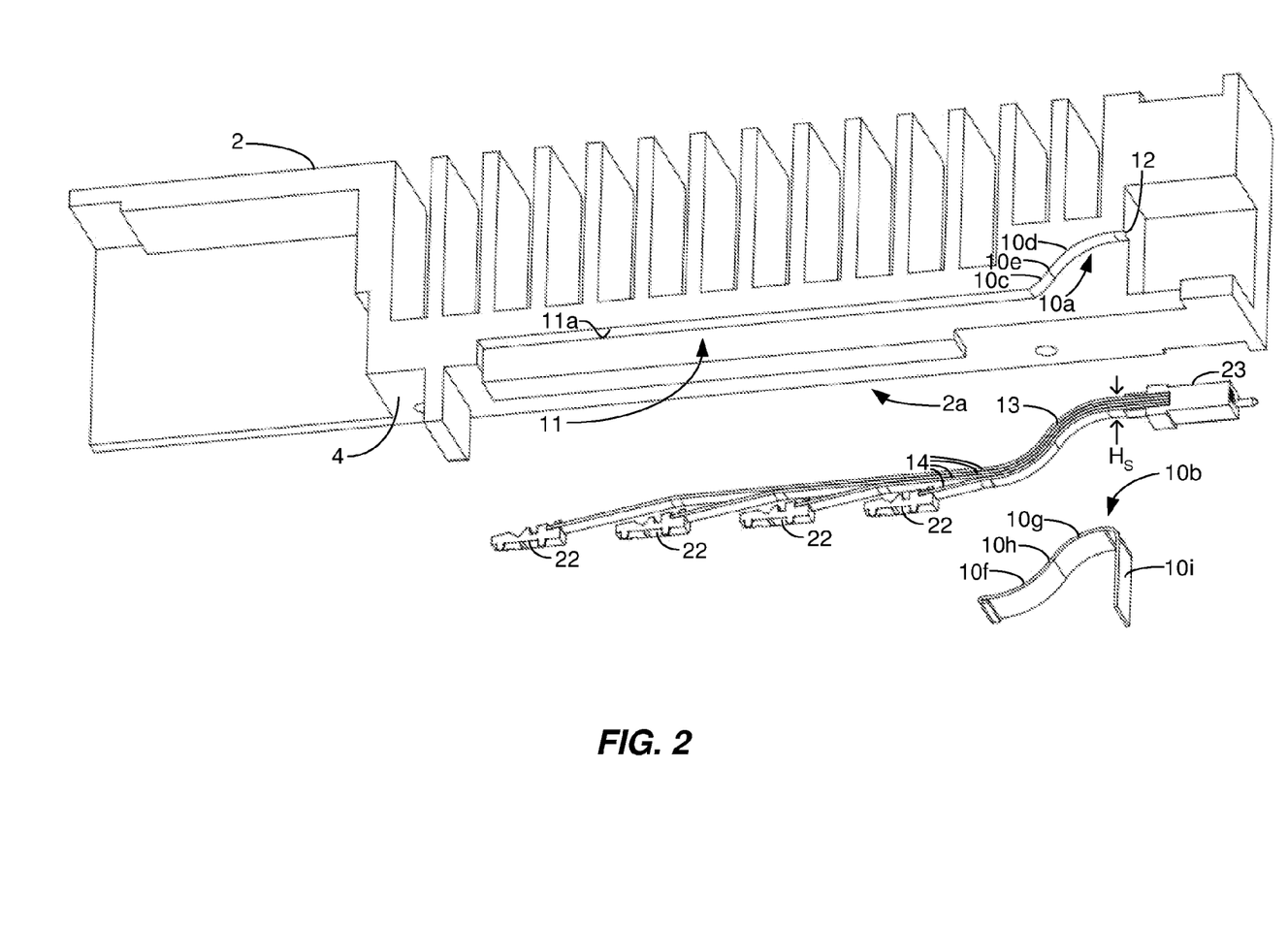
FIG. 2 illustrates an exploded cross-sectional perspective view of the parallel optical communications system shown in FIG. 1 with the bottom housing portion removed.
Figure 3:
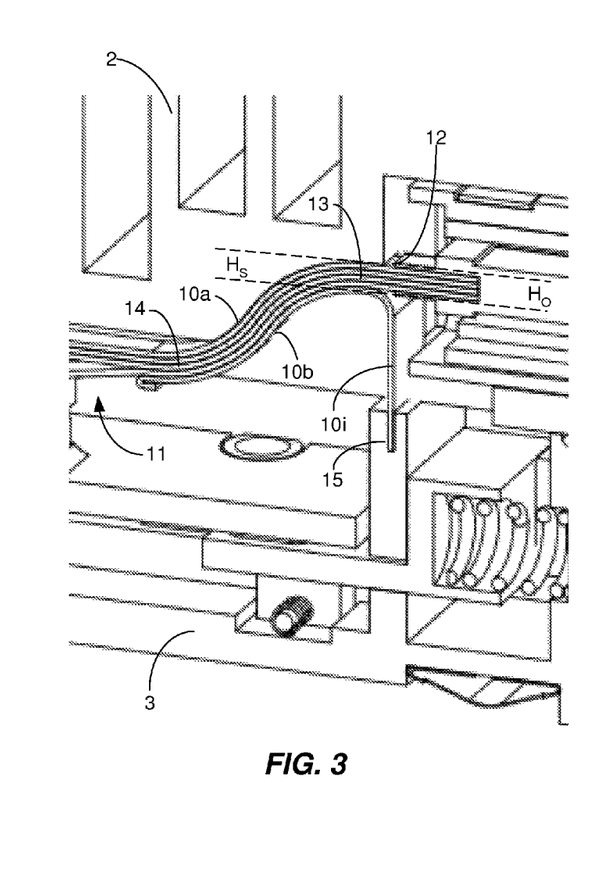
FIG. 3 is an enlarged cross-sectional side perspective view of a portion of the parallel optical communications system shown in FIG. 1.

FIG. 1 illustrates a cross-sectional side perspective view of a parallel optical communications system 1 that is equipped with an EMI containment apparatus in accordance with an illustrative embodiment of the invention. The system 1 includes an upper housing portion 2 and a lower housing portion 3 that are mechanically coupled to one another. FIG. 2 illustrates an exploded cross-sectional side perspective view of the parallel optical communications system 1 shown in FIG. 1 with the lower housing portion 3 removed to reveal the components of the EMI containment apparatus 10. FIG. 3 is an enlarged cross-sectional side perspective view of a portion of the system 1 shown in FIG. 1. Various features of the system 1 and of the EMI containment apparatus 10 will now be described with reference to FIGS. 1-3.

The EMI containment apparatus 1 includes a curved surface 10a formed in a lower surface 4 of the upper housing portion 2 and a spring device 10b. As will be described below in more detail with reference to FIG. 5, the EMI containment apparatus 10 may include additional elements, such as one or more EMI absorbers, or gaskets. The curved surface 10a formed in the lower surface 4 of the upper housing portion 2 is made up of at least first and second curved portions 10c and 10d, respectively, that meet in a transition region 10e of the curved surface 10a. The transition region 10e provides a seamless transition of the first and second curved portions 10c and 10d into one another. The transition region 10e is a planar surface such that, if an imaginary plane in which the planar surface lies is extended from the planar surface in directions toward the first and second curved portions 10c and 10d, the imaginary plane would be tangential to the first and second curved portions 10c and 10d at the locations where the first and second curved portions 10c and 10d meet the transition region 10e. Thus, the curved surface 10a, in accordance with this illustrative embodiment, is actually a double-curved surface, and will be referred to hereinafter as the double-curved surface 10a. The first curved portion 10c extends from the transition region 10e to a ceiling 11a of a trench 11 formed in the lower surface 4 of the upper housing portion 2. The second curved portion 10d extends from the transition region 10e to an opening 12 formed in the housing 2 through which a stack 13 of optical fiber ribbon cables 14 passes. The ceiling 11a of the trench 11 seamlessly transitions into the first curved portion 10c.

The spring device 10b has a first curved portion 10f, a second curved portion 10g, a transition region 10h in which the first and second curved portions 10f and 10g meet, and an attachment portion 10i. The transition region 10h provides a seamless transition of the first and second curved portions 10f and 10g into one another. The transition region 10h is a planar surface such that, if an imaginary plane in which the planar surface lies is extended from the planar surface in directions toward the first and second curved portions 10f and 10g, the imaginary plane would be tangential to the first and second curved portions 10f and 10g at the locations where the first and second curved portions 10f and 10g meet the transition region 10h. A proximal end of the attachment portion 10i is seated in a slot 15 formed in a wall of the lower housing portion 3. A distal end of the attachment portion 10i seamlessly transitions into the second curved portion 10g of the spring device 10b.

As indicated above, the double-curved surface 10a and the spring device 10b have shapes that are generally complementary to one another. When the upper and lower housing portions 2 and 3 are mechanically coupled together and the proximal end of the attachment portion 10i is seated in the slot 15, the stack 13 of optical fiber ribbon cables 14 is sandwiched in between the double-curved surface 10a and the spring device 10b. The double-curved surface 10a and the spring device 10b exert generally equal, but opposite, forces on the stack 13. The spring device 10b has an elasticity that allows it to be deformed from its original shape by application of a force against it. When deformed from its original shape, the spring device 10b will attempt to return to its original shape. When the upper and lower housing portions 2 and 3 are coupled together with the proximal end of the attachment portion 10i seated in the slot 15, the stack 13 sandwiched in between the double-curved surface 10a and the spring clip 10b exerts a force on the spring clip 10b that causes it to be temporarily deformed from its original shape. When temporarily deformed, the spring clip 10b exerts a force against the stack 13 as the spring clip 10b attempts to return to its original shape.

The exertion of these forces on the stack 13 by the double-curved surface and by the spring clip 10b presses the ribbon cables 14 together and removes air gaps between the cables 14, thereby minimizing the height, $H_S$, of the stack 13 (FIG. 3). Minimizing the height $H_S$ of the stack 13 allows the height, $H_O$, of the opening 12 (FIG. 3) to be minimized. The height $H_O$ is slightly greater than the height $H_S$ to allow the stack 13 to fit through the opening 12. Minimizing the height $H_O$ of the opening 12 helps limit the amount of EMI radiation that can escape from the system 1 through the opening 12.

In accordance with the illustrative embodiment shown in FIGS. 1-3, the parallel optical communications system 1 includes four parallel optical communications modules 21. Each of the modules 21 is connected to a respective optical connector module 22. Each of the optical connector modules 22 is connected to an end of a respective optical fiber ribbon cable 14. All of the optical fiber ribbon cables 14 are connected on their opposite ends to another optical connector 23, which is coupled by a connector coupler 24 to yet another optical connector 25. The optical connector 25 terminates an end of an optical fiber cable 26 that contains a number of optical fibers equal to the total number of optical fibers of all of the ribbon cables 14. The stack 13 of ribbon cables 14 passes through the opening 12 formed in the housing 2 and connects to the optical connector 23 on the opposite side of the opening 12. The optical connectors 23 and 25 include respective optics systems for optically coupling the respective optical signals between the respective optical fibers of the cables 14 and 26.

As can be seen in FIGS. 1 and 3, the stack 13 of ribbon cables 14 makes a first turn as it passes from the trench 11 into the pathway defined by the first curved portions 10c and 10f of the double-curved surface 10a and of the spring device 10b, respectively. The stack 13 of ribbon cables 14 makes a second turn as it passes from the portion of the pathway defined by the transition regions 10e and 10h of the double-curved surface 10a and of the spring device 10b, respectively, into the portion of the pathway defined by the second curved portions 10d and 10g of the double-curved surface 10a and of the spring device 10b, respectively. As is well known in the art, optical fibers have a minimum bend radius beyond which they cannot be bent without causing signal degradation and/or damage to the fibers. The aforementioned first and second turns should be relatively sharp, but not so sharp that the fibers of the ribbon cables 14 are bent beyond their minimum allowable bend radii at either the first turn or the second turn. However, the sharper that these first and second turns are, the more difficult it is for EMI radiation to propagate along the pathway and pass out of the opening 12, as will be described below in more detail with reference to FIGS. 4A-4D.

FIGS. 4A-4D illustrate cross-sectional side perspective views of different configurations of the upper housing portion of a parallel optical communications system having different EMI containment apparatuses in accordance with various other illustrative embodiments. For purposes of clarity, the lower housing portions are not shown in FIGS. 4A-4D. In each of the embodiments, the EMI containment apparatus includes a curved surface formed in a lower surface of the upper housing portion and a spring device having a curved surface that is generally complementary in shape to the curved surface formed in the lower surface of the upper housing portion. However, the curved surface formed in the lower surface of the upper housing portion and shape of the spring device is different in each of the embodiments, as will now be described with reference to FIGS. 4A-4D.

Figure 4A:
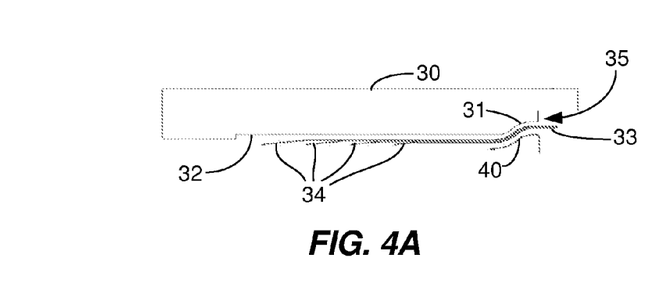
FIGS. 4A-4D illustrate cross-sectional side perspective views of different configurations of the upper housing portion of a parallel optical communications system having different EMI containment apparatuses in accordance with various other illustrative embodiments.

With reference to FIG. 4A, the upper housing portion 30 and the spring device 40 are similar or identical to the upper housing portion 2 and the spring device 10b, respectively, shown in FIGS. 1-3. The upper housing portion 30 has a double-curved surface 31 formed in a lower surface 32 of the upper housing portion 30. The double-curved surface 31 and the spring device 40 comprise the EMI containment apparatus. A stack 33 of optical fiber ribbon cables 34 is sandwiched in between the double-curved surface 31 and the spring device 40 when the upper housing portion 30 is mechanically coupled with a lower housing portion (not shown for purposes of clarity). The double-curved surface 31 and the spring device 40 perform the functions described above of (1) reducing the height of the stack 33 to enable the height of an opening 35 through which the stack 33 passes to be reduced, and of (2) sharply turning the pathway along which the stack 33 extends. The result of performing both of these functions is that EMI radiation is attenuated and/or reflected before it has an opportunity to pass out of the opening 35.

Figure 4B:
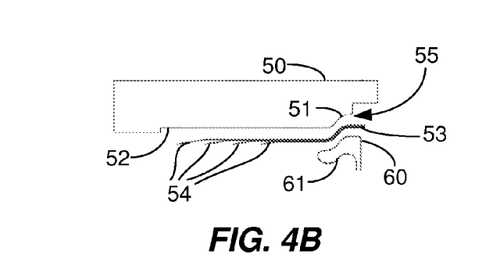

With reference to FIG. 4B, the upper housing portion 50 and the spring device 60 are similar to the upper housing portion 2 and the spring device 10b, respectively, shown in FIGS. 1-3 except that the curves of the curved surfaces are steeper and the spring device 60 includes a lower support member 61. The upper housing portion 50 has a double-curved surface 51 formed in a lower surface 52 thereof. The double-curved surface 51 and the spring device 60 comprise the EMI containment apparatus. A stack 53 of optical fiber ribbon cables 54 is sandwiched in between the double-curved surface 51 and the spring device 60 when the upper housing portion 50 is mechanically coupled with a lower housing portion (not shown for purposes of clarity). The double-curved surface 51 and the spring device 60 perform the functions described above of (1) reducing the height of the stack 53 to enable the height of an opening 55 through which the stack 53 passes to be reduced, and of (2) sharply turning the pathway along which the stack 53 extends. The result of performing both of these functions is that EMI radiation is attenuated and/or reflected before it has an opportunity to pass out of the opening 55.

It can be seen from a comparison of FIGS. 4A and 4B that the curved surfaces of the double-curved surface 51 and of the spring device 60 are steeper than the curved surfaces of the double-curved surface 31 and of the spring device 40, respectively. This increased steepness decreases the likelihood that EMI radiation will propagate along the pathway defined by these surfaces and pass out of the opening 55. Most if not all of the EMI radiation propagating along this pathway will be reflected or absorbed before it reaches the opening 55.

Figure 4C:
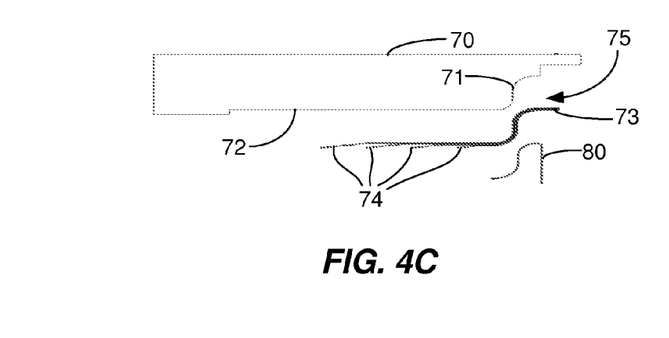

With reference to FIG. 4C, the upper housing portion 70 and the spring device 80 are similar to the upper housing portion 2 and the spring device 10b, respectively, shown in FIGS. 1-3 except that the curved surfaces are even steeper. The upper housing portion 70 has a double-curved surface 71 formed in a lower surface 72 thereof. The double-curved surface 71 and the spring device 80 comprise the EMI containment apparatus. A stack 73 of optical fiber ribbon cables 74 is sandwiched in between the double-curved surface 71 and the spring device 80 when the upper housing portion 70 is mechanically coupled with a lower housing portion (not shown for purposes of clarity). The double-curved surface 71 and the spring device 80 perform the functions described above of (1) reducing the height of the stack 73 to enable the height of an opening 75 through which the stack 73 passes to be reduced, and of (2) sharply turning the pathway along which the stack 73 extends. The result of performing both of these functions is that EMI radiation is attenuated and/or reflected before it has an opportunity to pass out of the opening 75.

It can be seen from a comparison of FIGS. 4B and 4C that the curved surfaces of the double-curved surface 71 and of the spring device 80 are steeper than the curved surfaces of the double-curved surface 51 and of the spring device 60, respectively. This increased steepness further decreases the likelihood that EMI radiation will propagate along the pathway defined by these surfaces and pass out of the opening 75. Most if not all of the EMI radiation propagating along this pathway will be reflected or absorbed before it reaches the opening 75. It can be seen from FIG. 4C that this first and second turns in the stack 73 are about 90° turns. These very sharp turns in the stack 73 make it extremely unlikely that EMI radiation propagating along this pathway will reach the opening 75.

Figure 4D:
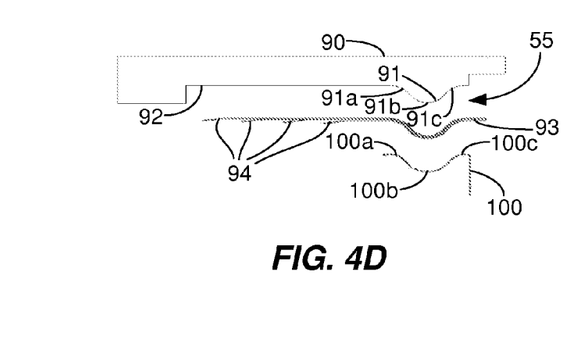

With reference to FIG. 4D, the upper housing portion 90 has a triple-curved surface 91 formed in a lower surface 92 of the upper housing portion 90. The spring device 100 also has a triple-curved surface such that it has a shape that is generally complementary to the shape of the triple curved surface 91. The triple-curved surface 91 includes a first curved portion 91a, a second curved portion 91b, and a third curved portion 91c. The second curved portion 91b provides a transition between the first and third curved portions 91a and 91c, respectively. This sequence of curved surfaces provides a downwardly sloping curve, followed by an upwardly sloping curve, followed by a downwardly sloping curve. The triple-curved surface 91 and the spring device 100 comprise the EMI containment apparatus.

A stack 93 of optical fiber ribbon cables 94 is sandwiched in between the triple-curved surface 91 and the spring device 100 when the upper housing portion 90 is mechanically coupled with a lower housing portion (not shown for purposes of clarity). The triple-curved surface 91 and the spring device 100 perform the functions described above of (1) reducing the height of the stack 93 to enable the height of an opening 95 through which the stack 93 passes to be reduced, and of (2) sharply turning the pathway along which the stack 93 travels. Because of the sequence of upwardly and downwardly sloping surfaces, the stack 93 changes directions three times, which further decreases the likelihood that EMI radiation propagating along this pathway will pass out of the opening 95.

It can be seen from the above description of FIGS. 4A-4D that the EMI containment apparatuses can have a variety of configurations while still achieving the goals of the invention. In all cases, the curved pathway for the stack of optical fiber ribbon cables that is defined by the EMI containment apparatus compresses the cables together to decrease the height of the stack and causes the stack to make multiple sharp turns, i.e., two or more sharp turns. Each of these functions limits the amount of EMI radiation that is allowed to pass out of the opening in the housing through which the stack passes. Combining these functions drastically reduces the amount of EMI radiation that is allowed to pass through the opening. The sharp turns cause most or all of the EMI radiation to be reflected or absorbed before it reaches the opening. Furthermore, because the reducing the height of the stack enables the height of the opening to be reduced, EMI radiation that reaches the opening, but impinges on portions of the housing surrounding the opening will be reflected or absorbed. This latter feature even further reduces the amount of EMI radiation that is allowed to pass through the opening. In addition, as will now be described with reference to FIG. 5, the EMI containment apparatus may also include an EMI absorbing material, such as an EMI gasket, that absorbs EMI radiation propagating along the pathway defined by the curved surface of the housing and by the spring device.

Figure 5:
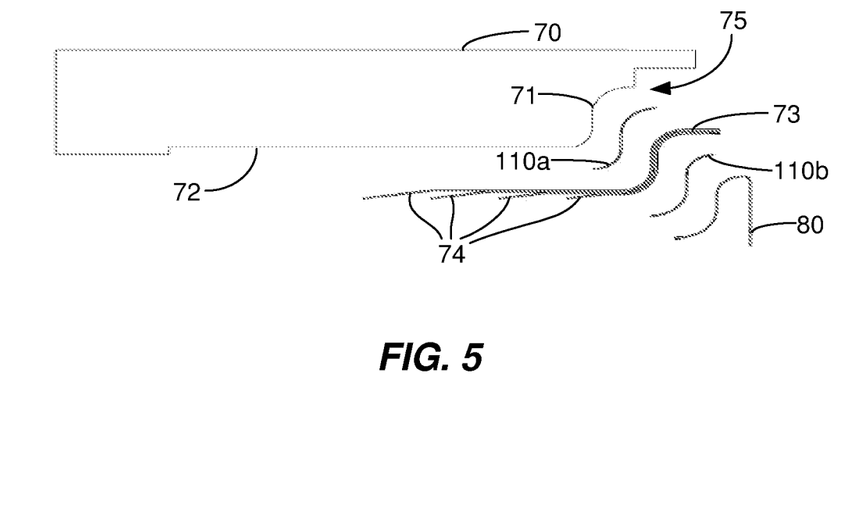
FIG. 5 illustrates a cross-sectional side perspective view of the upper housing, the spring device and the stack of optical fiber ribbon cables shown in FIG. 4C with two EMI absorbers disposed on opposite sides of the stack.

FIG. 5 illustrates a cross-sectional side perspective view of the upper housing 70, the spring device 80 and the stack 73 of optical fiber ribbon cables 74 shown in FIG. 4C with two EMI absorbers 110a and 110b disposed on opposite sides of the stack 73. The EMI absorbers 110a and 110b may be considered to be components of the EMI containment apparatus.

The EMI absorbers 110a and 110b are strips of foam polymer material that are designed to absorb EMI radiation. EMI absorbers that are suitable for this purpose are available on the market. For example, a company called Emerson & Cuming Microwave Products, Inc. makes a variety of Eccosorb® EMI absorbers that are designed to attenuate EMI radiation by converting EMI radiation into heat. Such EMI absorbers are suitable for use with the invention. In accordance with the illustrative embodiment shown in FIG. 5, the EMI absorber 110a is disposed in between the double-curved surface 71 and the stack 73 and the EMI absorber 110b is disposed in between the stack 73 and the spring device 80.

When the upper housing portion 70 and the lower housing portion (not shown for purposes of clarity) are coupled together, the EMI absorbers 110a and 110b and the stack 73 are sandwiched in between the double-curved surface 71 and the spring 80. The EMI absorbers 110a and 110b are flexible and compressible to allow the forces exerted by the double-curved surface 71 and by the spring device 80 to compress the EMI absorbers 110a and 110b and the stack 73, thereby removing any air gaps that are in between the cables 74 and reducing the height of the stack 73. Most if not all of the EMI radiation that propagates along the pathway defined by the double-curved surface 71 and the spring device 80 will propagate into the EMI absorbers 110a and 110b and be absorbed by them. EMI radiation that is not absorbed by the EMI absorbers 110a and 110b may be reflected off of the double-curved surface 71 and/or off of the spring device 80 in directions away from the opening 75. Very little, if any, EMI radiation will pass through the opening 75.

Figure 6A:
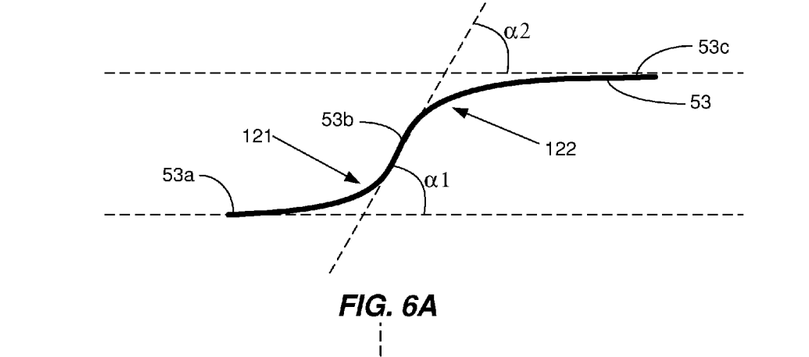
FIGS. 6A and 6B illustrate side plan views of the stacks of optical fiber ribbon cables shown in FIGS. 4B and 4C, respectively, that are curved differently due to being sandwiched in between the different EMI containment apparatuses shown in FIGS. 4B and 4C, respectively.
Figure 6B:
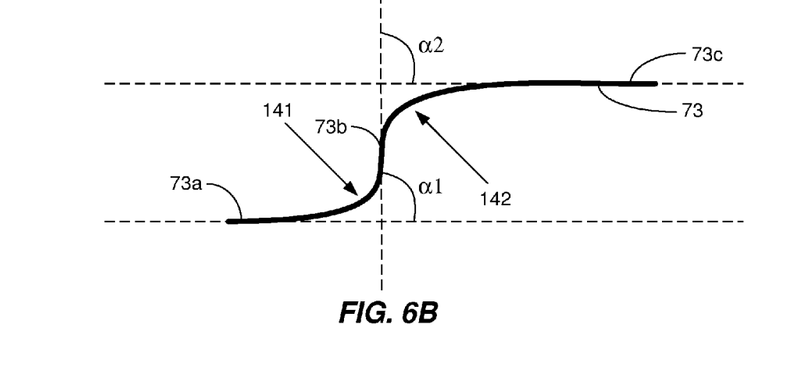

FIGS. 6A and 6B illustrate side plan views of portions of the stacks 53 and 73, respectively, of the optical fiber ribbon cables 54 and 74, respectively, shown in FIGS. 4B and 4C, respectively, that are curved due to being sandwiched in between the different EMI containment apparatuses shown in FIGS. 4B and 4C, respectively. The curved portions of the stacks 53 and 73 are both generally S-shaped. For purposes of clarity, the EMI containment apparatuses are not shown in FIGS. 6A and 6B. Because the curved surfaces of the EMI containment apparatus shown in FIG. 4C are steeper than the curved surfaces of the EMI containment apparatus shown in FIG. 4B, it is more difficult for EMI radiation propagating along the stack 73 (FIG. 4C) to reach the opening 75 (FIG. 4C) than it is for EMI radiation propagating along the stack 53 (FIG. 4B) to reach the opening 55 (FIG. 4B). However, as indicated above, the stack of optical fiber ribbon cables should not be bent beyond their minimum allowable bend radii.

With reference to FIG. 6A, a first portion 53a of the stack 53 lies in a first plane that is generally parallel to the lower surface 32 of the upper housing portion 30. A second portion 53b of the stack 53 lies in a second plane that is at a first angle, ca, to the first plane due to a first turn or bend 121 formed in the stack 53 by the EMI containment apparatus 51, 60, where $\alpha1$ is about 60° in this illustrative embodiment. A third portion 53c of the stack 53 is in a third plane that is at a second angle, $\alpha2$, to the second plane due to a second turn or bend 122 formed in the stack 53 by the EMI containment apparatus 51, 60. In this illustrative embodiment, $\alpha2=\alpha1$ such that the third plane is generally parallel to the first plane. It is not necessary, however, that $\alpha2=\alpha1$, although this will typically be the case.

With reference to FIG. 6B, a first portion 73a of the stack 73 lies in a first plane that is generally parallel to the lower surface 72 of the upper housing portion 70. A second portion 73b of the stack 73 lies in a second plane that is at a first angle, $\alpha1$, to the first plane due to a first turn or bend 141 formed in the stack 73 by the EMI containment apparatus 71, 80, where $\alpha1$ is about 90° in this illustrative embodiment. A third portion 73c of the stack 73 lies in a third plane that is at a second angle, $\alpha2$, to the second plane due to a second turn or bend 142 formed in the stack 73 by the EMI containment apparatus 71, 80. In this illustrative embodiment, $\alpha2=\alpha1$ such that the third plane is generally parallel to the first plane in which the first portion 73a of the stack 73 lies. It is not necessary, however, that $\alpha2=\alpha1$, although this will typically be the case.

It can be seen from a comparison of FIGS. 6A and 6B that increasing ca increases the steepness of the second portions 53b and 73b, respectively, of the stacks 53 and 73, respectively. On the other hand, it can also be seen from a comparison of FIGS. 6A and 6B that decreasing $\alpha1$ decreases the steepness of the second portions 53b and 73b, respectively, of the stacks 53 and 73, respectively. The steepness of these portions of the stacks is increased by making the turns or bends 121 and 141 sharper, i.e., by increasing the angles $\alpha1$. Increased steepness typically makes it less likely that EMI radiation will ever reach the openings 55 and 75, but also typically results in increases in the overall height of the top housing portions 50 and 70. A less steep, or shallower, angle $\alpha1$ will not result in as a great of an increase in the overall height of the upper housing portions 50 and 70, but may result in more EMI radiation reaching the openings 55 and 75, respectively. Persons of skill in the art will understand, in view of the description provided herein, the manner in which a design that achieves the necessary steepness can be selected based on the amount of EMI containment that is required or desired and based on other design constraints, such as the required or desired height of the housing, for example.

It should be noted that the maximum value of $\alpha1$ is limited only by the minimum bend radius of the optical fiber ribbon cables. For example, it is possible that $\alpha1$ could be greater than 90°, but not so great that the ribbon cables are bent beyond their minimum bend radii. The value of $\alpha$ will typically range from about 20° to about 90°, and preferably from about 40° to about 90°. As indicated above, other design constraints may dictate the value of $\alpha1$, such as height constraints and EMI containment requirements. Also, when one or more of the EMI absorbers 110a, 110b (FIG. 5) are included in the EMI containment apparatus, the value of $\alpha1$ that the apparatus is designed to achieve can be smaller.

It should be noted that the EMI containment apparatus of the invention may be used with a single optical fiber ribbon cable as opposed to a stack of optical fiber ribbon cables. The EMI containment apparatuses have been described herein with reference to their use with a stack of optical fiber ribbon cables to demonstrate the advantage of pressing the ribbon cables together to remove air gaps between them in order to decrease the height of the stack, which enables the height of the opening in the housing to be decreased. However, even if the EMI containment apparatus is used with a single optical fiber ribbon cable, it will still provide the advantage of creating the turns, or bends, in the cable that help limit the amount of EMI radiation that passes out of the opening of the housing. It should also be noted that the EMI apparatus has been described herein with reference to its use with parallel optical communications systems due to the fact that such systems typically use optical fiber ribbon cables and therefore would benefit from the use of the invention. The invention, however, may also be beneficially used in other EMI-sensitive environments in which optical fiber ribbon cables are used, but in which they are not used in connection with a parallel optical communications system.

It should be noted that the invention has been described with respect to illustrative embodiments for the purpose of describing the principles and concepts of the invention. The invention is not limited to these embodiments. As will be understood by those skilled in the art in view of the description being provided herein, modifications may be made to the embodiments described herein without deviating from the scope of the invention. For example, while the invention has been described with reference to a housing having an upper housing portion and a lower housing portion that are coupled together, a housing that is a single, unitary, part may also be used. Also, the invention may be used in parallel optical transmitter systems that do not have receiver functionality, in parallel optical receiver systems that do not have transmitter functionality, and in parallel optical transceiver systems that have both transmitter and receiver functionality. The term "parallel optical communications system", as that term is used herein, is intended to denote all such systems. The invention also is not limited with respect to the type of parallel optical communications system with which it is used, or with respect to the types of optical fiber cables that are used.

What is claimed is:

1. A parallel optical communications system comprising:
a housing, the housing having a curved surface formed therein adjacent an opening of the housing through which an optical fiber ribbon cable passes, the curved surface including at least first and second curved portions and a transition region in between the first and second curved portions;
at least a first parallel optical communications module mounted in the housing;
at least a first optical fiber ribbon cable passing through the opening of the housing into an interior space of the housing, the first optical fiber ribbon cable being attached on an end thereof to the first parallel optical communications module; and
a spring device disposed within the housing, the curved surface of the housing and the spring device comprising an electromagnetic interference (EMI) containment apparatus, the spring device having a curved surface that is generally complementary in shape to a shape of the curved surface of the housing, wherein a length of the first optical fiber ribbon cable is sandwiched in between the curved surface of the housing and the curved surface of the spring device such that the sandwiched length of the first optical fiber ribbon cable has a curved shape that is defined by the curved surfaces of the housing and of the spring device, and wherein the curved shape of the sandwiched length of the optical fiber ribbon cable helps prevent EMI radiation from propagating along the sandwiched length of the first optical fiber ribbon cable and passing through the opening of the housing.

2. The parallel optical communications system of claim 1, further comprising:
at least a second parallel optical communications module mounted in the housing; and
at least a second optical fiber ribbon cable passing through the opening of the housing into the interior space of the housing, the second optical fiber ribbon cable being attached on an end thereof to the second parallel optical communications module, wherein a length of the second optical fiber ribbon cable and the length of the first optical fiber ribbon cable form a stack that is sandwiched in between the curved surface of the housing and the curved surface of the spring device such that the sandwiched stack of optical fiber ribbon cables has a curved shape that is defined by the curved surfaces of the housing and of the spring device, and wherein the curved surface of the housing and the curved surface of the spring device exert forces on the sandwiched stack that compress the sandwiched stack to remove air gaps in between the first and second optical fiber ribbon cables of the sandwiched stack, thereby decreasing a height of the sandwiched stack, and wherein the opening of the housing has a height that is slightly larger than the height of the sandwiched stack to allow the stack to pass through the opening.

3. The parallel optical communications system of claim 2, wherein the curved shape of the sandwiched stack helps prevent EMI radiation from propagating along the sandwiched stack and passing through the opening of the housing.

4. The parallel optical communications system of claim 2, wherein a first portion of the sandwiched stack lies in a first plane, and wherein a second portion of the sandwiched stack lies in a second plane that is at an angle, $\alpha 1$, to the first plane, and wherein a third portion of the sandwiched stack lies in a third plane that is at an angle, $\alpha 2$, to the second plane, wherein $\alpha 1$ is greater than 0° and less than an angle that would result in the stack being bent beyond an allowable minimum bend radius of the first and second optical fiber ribbon cables.

5. The parallel optical communications system of claim 4, wherein $\alpha 1$ is greater than 0° and less than about 90°.

6. The parallel optical communications system of claim 4, wherein $\alpha 1$ is greater than about 40° and less than about 90°.

7. The parallel optical communications system of claim 4, wherein the first and third planes are generally parallel to one another.

8. The parallel optical communications system of claim 1, wherein the curved surfaces of the housing and of the spring device are generally S-shaped such that the curved shape of the sandwiched length of the first optical fiber ribbon cable is also generally S-shaped.

9. The parallel optical communications system of claim 1, wherein a first portion of the sandwiched length of the first optical fiber ribbon cable lies in a first plane, and wherein a second portion of the sandwiched length of the first optical fiber ribbon cable lies in a second plane that is at an angle, $\alpha 1$, to the first plane, and wherein a third portion of the sandwiched length of the first optical fiber ribbon cable lies in a third plane that is at an angle, $\alpha 2$, to the second plane, wherein $\alpha 1$ is greater than 0° and less than an angle that would result in the first optical fiber ribbon cable being bent beyond an allowable minimum bend radius.

10. The parallel optical communications system of claim 9, wherein $\alpha 1$ is greater than 0° and less than about 90°.

11. The parallel optical communications system of claim 9, wherein $\alpha 1$ is greater than about 40° and less than about 90°.

12. The parallel optical communications system of claim 9, wherein the first and third planes are generally parallel to one another.

13. The parallel optical communications system of claim 1, wherein the curved surface of the housing includes at least first, second and third curved portions and transition regions in between the first and second curved portions and in between the second and third curved portions, and wherein a shape of the curved surface of the spring device is generally complementary to a shape of the curved surface of the housing.

14. A parallel optical communications system comprising:
a housing, the housing having a curved surface formed therein adjacent an opening of the housing through which an optical fiber ribbon cable passes, the curved surface including at least first and second curved portions and a transition region in between the first and second curved portions;

at least first and second parallel optical communications module mounted in the housing;

at least first and second optical fiber ribbon cables passing through the opening of the housing into an interior space of the housing, the first and second optical fiber ribbon cables being attached on first ends thereof to the first and second parallel optical communications modules, respectively; and a spring device disposed within the housing, the curved surface of the housing and the spring device comprising an electromagnetic interference (EMI) containment apparatus, the spring device having a curved surface that is generally complementary in shape to a shape of the curved surface of the housing, wherein a length of the first optical fiber ribbon cable and a length of the second optical fiber ribbon cable are stacked and sandwiched in between the curved surface of the housing and the curved surface of the spring device such that the sandwiched stack has a curved shape that is defined by the curved surfaces of the housing and of the spring device, and wherein the curved shape of the sandwiched stack helps prevent EMI radiation from propagating along the sandwiched stack and passing through the opening of the housing, and wherein, and wherein the curved surface of the housing and the curved surface of the spring device exert forces on the sandwiched stack that compress the sandwiched stack to remove air gaps in between the first and second optical fiber ribbon cables, thereby decreasing a height of the sandwiched stack, and wherein the opening of the housing has a height that is slightly larger than the height of the sandwiched stack to allow the stack to pass through the opening.

15. The parallel optical communications system of claim 14, wherein a first portion of the sandwiched stack lies in a first plane, and wherein a second portion of the sandwiched stack lies in a second plane that is at an angle, $\alpha 1$, to the first plane, and wherein a third portion of the sandwiched stack lies in a third plane that is at an angle, $\alpha 2$, to the second plane, wherein $\alpha 1$ is greater than 0° and less than an angle that would result in the stack being bent beyond an allowable minimum bend radius of the first and second optical fiber ribbon cables.

16. The parallel optical communications system of claim 15, wherein $\alpha 1$ is greater than 0° and less than about 90°.

17. The parallel optical communications system of claim 15, wherein $\alpha 1$ is greater than about 40° and less than about 90°.

18. The parallel optical communications system of claim 14, wherein the first and third planes are generally parallel to one another.

19. A method for performing electromagnetic interference (EMI) containment in a parallel optical communications system, the method comprising:

inside of a housing of the parallel optical communications system, sandwiching a length of at least a first optical fiber ribbon cable in between a curved surface of the housing and a curved surface of a spring device, the curved surface of the housing and the curved surface of the spring device comprising an EMI containment apparatus, the curved surface of the housing being adjacent an opening of the housing through which the optical fiber ribbon cable passes, the curved surface of the housing including at least first and second curved portions and a transition region in between the first and second curved portions, the spring device having a curved surface that is generally complementary in shape to a shape of the curved surface of the housing, wherein the sandwiched length of the first optical fiber ribbon cable has a curved shape that is defined by the curved surfaces of the housing and of the spring device, and wherein the curved shape of the sandwiched length of the optical fiber ribbon cable helps prevent EMI radiation from propagating along the sandwiched length of the first optical fiber ribbon cable and passing through the opening of the housing.

20. The method of claim 19, further comprising:

inside of the housing of the parallel optical communications system, sandwiching a length of at least a second optical fiber ribbon cable along with the length of the first optical fiber ribbon cable in between the curved surface of the housing and the curved surface of a spring device, the sandwiched lengths of the first and second optical fiber ribbon cables comprising a sandwiched stack of optical fiber ribbon cables, and wherein the curved shape of the sandwiched stack helps prevent EMI radiation from propagating along the sandwiched stack and passing through the opening of the housing.

21. The method of claim 20, wherein the curved surface of the housing and the curved surface of the spring device exert forces on the sandwiched stack that compress the sandwiched stack to remove air gaps in between the first and second optical fiber ribbon cables of the sandwiched stack, thereby decreasing a height of the sandwiched stack, and wherein the opening of the housing has a height that is slightly larger than the height of the sandwiched stack to allow the stack to pass through the opening.

22. The method of claim 21, wherein a first portion of the sandwiched stack lies in a first plane, and wherein a second portion of the sandwiched stack lies in a second plane that is at an angle, $\alpha 1$, to the first plane, and wherein a third portion of the sandwiched stack lies in a third plane that is at an angle, $\alpha 2$, to the second plane, wherein $\alpha 1$ is greater than 0° and less than an angle that would result in the stack being bent beyond an allowable minimum bend radius of the first and second optical fiber ribbon cables.

23. The method of claim 22, wherein $\alpha 1$ is greater than 0° and less than about 90°.

24. The method of claim 22, wherein $\alpha 1$ is greater than about 40° and less than about 90°.

25. The method of claim 22, wherein the first and third planes are generally parallel to one another.

26. The method of claim 19, wherein the curved surfaces of the housing and of the spring device are generally S-shaped such that the curved shape of the sandwiched length of the first optical fiber ribbon cable is also generally S-shaped.

27. The method of claim 19, wherein a first portion of the sandwiched length of the first optical fiber ribbon cable lies in a first plane, and wherein a second portion of the sandwiched length of the first optical fiber ribbon cable lies in a second plane that is at an angle, $\alpha 1$, to the first plane, and wherein a third portion of the sandwiched length of the first optical fiber ribbon cable lies in a third plane that is at an angle, $\alpha 2$, to the second plane, wherein $\alpha 1$ is greater than 0° and less than an angle that would result in the first optical fiber ribbon cable being bent beyond an allowable minimum bend radius.

28. The method of claim 27, wherein $\alpha 1$ is greater than 0° and less than about 90°.

29. The method of claim 27, wherein $\alpha 1$ is greater than about 40° and less than about 90°.

30. The method of claim 27, wherein the first and third planes are generally parallel to one another.

31. The method of claim 19, wherein the curved surface of the housing includes at least first, second and third curved portions and transition regions in between the first and second curved portions and in between the second and third curved portions, and wherein a shape of the curved surface of the spring device is generally complementary to a shape of the curved surface of the housing.

* * * * *